US010158561B2

(12) United States Patent
Guichard et al.

(10) Patent No.: US 10,158,561 B2
(45) Date of Patent: *Dec. 18, 2018

(54) DATA PLANE LEARNING OF BI-DIRECTIONAL SERVICE CHAINS

(71) Applicant: Cisco Technology, Inc., San Jose, CA (US)

(72) Inventors: James Guichard, New Boston, NH (US); Paul Quinn, San Francisco, CA (US); David Ward, Los Gatos, CA (US); Surendra Kumar, San Ramon, CA (US); Yavindra Yadav, Cupertino, CA (US); Michael R. Smith, San Jose, CA (US); Nagaraj A. Bagepalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/966,737

(22) Filed: Dec. 11, 2015

(65) Prior Publication Data

US 2016/0099867 A1 Apr. 7, 2016

Related U.S. Application Data

(63) Continuation of application No. 13/891,245, filed on May 10, 2013, now Pat. No. 9,246,799.

(51) Int. Cl.
  *H04L 12/725* (2013.01)
  *H04L 12/851* (2013.01)
  (Continued)

(52) U.S. Cl.
  CPC ........ *H04L 45/306* (2013.01); *H04L 41/0893* (2013.01); *H04L 47/2441* (2013.01); *H04L 69/22* (2013.01)

(58) Field of Classification Search
  CPC ... H04L 45/306; H04L 47/2441; H04L 69/22; H04L 41/0893
  (Continued)

(56) References Cited

U.S. PATENT DOCUMENTS

| 6,985,488 B2 * | 1/2006 | Pan ...................... H04J 3/1617 370/395.3 |
| 7,480,283 B1 | 1/2009 | Sylvain |

(Continued)

FOREIGN PATENT DOCUMENTS

CN 101772918 A 7/2010

OTHER PUBLICATIONS

International Search Report and Written Opinion in counterpart International Application No. PCT/US2014/036789, dated Aug. 21, 2014, 14 pages.

(Continued)

*Primary Examiner* — Man U Phan
(74) *Attorney, Agent, or Firm* — Edell, Shapiro & Finnan, LLC (57) ABSTRACT

Techniques are provided to decouple service chain structure from the underlying network forwarding state and allow for data plane learning of service chain forwarding requirements and any association between services function state requirements and the forward and reverse forwarding paths for a service chain. In a network comprising a plurality of network nodes each configured to apply a service function to traffic that passes through the respective network node, a packet is received at a network node. When the network node determines that the service function it applies is stateful, it updates context information in a network service header of the packet to indicate that the service function applied at the network node is stateful and that traffic for a (Continued)

reverse path matching the classification criteria is to be returned to the network node.

20 Claims, 7 Drawing Sheets

(51) Int. Cl.
*H04L 29/06* (2006.01)
*H04L 12/24* (2006.01)

(58) Field of Classification Search
USPC .......... 370/392–401, 200–252; 709/221–247
See application file for complete search history.

(56) References Cited

U.S. PATENT DOCUMENTS

| | | | |
|---|---|---|---|
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 7,895,425 B2* | 2/2011 | Khalid | H04L 12/4633 |
| | | | 709/226 |
| 8,150,963 B2 | 4/2012 | Baek et al. | |
| 8,166,205 B2* | 4/2012 | Farinacci | H04L 12/4641 |
| | | | 370/389 |
| 8,311,045 B2 | 11/2012 | Quinn et al. | |
| 8,369,330 B2 | 2/2013 | Allan et al. | |
| 8,442,043 B2 | 5/2013 | Sharma et al. | |
| 8,532,087 B2 | 9/2013 | Kojima et al. | |
| 8,645,576 B2* | 2/2014 | Farinacci | H04L 12/4641 |
| | | | 370/254 |
| 8,948,055 B2* | 2/2015 | Bragg | H04L 12/462 |
| | | | 370/255 |
| 8,953,590 B1* | 2/2015 | Aggarwal | H04L 12/4675 |
| | | | 370/389 |
| 9,240,975 B2* | 1/2016 | Roberson | H04L 63/02 |
| 9,258,243 B2* | 2/2016 | Guichard | H04L 47/2475 |
| 9,258,742 B1* | 2/2016 | Pianigiani | H04L 67/327 |
| 9,455,901 B2* | 9/2016 | Davie | H04L 45/16 |
| 9,485,147 B2* | 11/2016 | Gu | H04L 12/4641 |
| 9,699,070 B2* | 7/2017 | Davie | H04L 45/16 |
| 2006/0092950 A1 | 5/2006 | Arregoces et al. | |
| 2006/0095960 A1 | 5/2006 | Arregoces et al. | |
| 2007/0286204 A1 | 12/2007 | Ould-Brahim | |
| 2008/0049621 A1* | 2/2008 | McGuire | H04L 12/24 |
| | | | 370/236.2 |
| 2008/0120394 A1 | 5/2008 | Yokoyama et al. | |
| 2008/0177896 A1 | 7/2008 | Quinn et al. | |
| 2009/0037713 A1 | 2/2009 | Khalid et al. | |
| 2009/0292824 A1* | 11/2009 | Marashi | H04L 29/12066 |
| | | | 709/247 |
| 2009/0304010 A1 | 12/2009 | Kurebayashi et al. | |
| 2010/0077063 A1 | 3/2010 | Amit et al. | |
| 2010/0165985 A1 | 7/2010 | Sharma et al. | |
| 2011/0054644 A1 | 3/2011 | Baek et al. | |
| 2012/0324091 A9 | 12/2012 | Raleigh et al. | |
| 2013/0065551 A1 | 3/2013 | Raleigh et al. | |
| 2013/0322444 A1* | 12/2013 | Ossipov | H04L 45/18 |
| | | | 370/392 |
| 2014/0050223 A1 | 2/2014 | Foo et al. | |
| 2014/0307744 A1* | 10/2014 | Dunbar | H04L 45/44 |
| | | | 370/401 |
| 2014/0334488 A1 | 11/2014 | Guichard et al. | |
| 2015/0281173 A1* | 10/2015 | Quinn | H04L 61/2507 |
| | | | 709/245 |
| 2015/0326473 A1* | 11/2015 | Dunbar | H04L 12/4633 |
| | | | 370/392 |
| 2016/0285736 A1* | 9/2016 | Gu | H04L 12/2858 |

OTHER PUBLICATIONS

Rosen et al., "BGP/MPLS IP Virtual Private Networks (VPNs)," Network Working Group, RFC 4364, Feb. 2006, pp. 1-47.
English translation of First Office Action and Search Report in corresponding Chinese Application No. 201480026180.9, dated Jan. 30, 2018, 6 pgs.

* cited by examiner

DATA PLANE LEARNING OF BI-DIRECTIONAL SERVICE CHAINS

CROSS REFERENCE TO RELATED APPLICATION

This application is a continuation of U.S. patent application Ser. No. 13/891,245 filed on May 10, 2013, which issued as U.S. Pat. No. 9,246,799 on Jan. 26, 2016, which are incorporated herein by reference in their entirety.

TECHNICAL FIELD

The present disclosure relates to networking for service chains.

BACKGROUND

Service chains define a set of service functions (e.g., firewalls, Deep Packet Inspection, etc.), and their order (service1→service2) to be applied to selective packets as they are forwarded through a network. The order in which services are applied is predetermined through an orchestration function and that order is mapped into each network node that is involved in the forwarding of packets through a given service chain. The mapping of forwarding state to service chain structure is referred to as a service path.

The service path for a given service chain may be unidirectional or bidirectional dependent upon whether one or more of the service functions in the chain hold state information that needs to be maintained in the forward and reverse packet forwarding paths.

DESCRIPTION OF EXAMPLE EMBODIMENTS

Overview

Presented herein are techniques to decouple service chain structure from the underlying network forwarding state and allow for data plane learning of service chain forwarding requirements and any association between services function state requirements and the forward and reverse forwarding paths for a service chain. In a network comprising a plurality of network nodes each configured to apply a service function to traffic that passes through the respective network node, a packet is received at a network node, the packet having a network service header that includes service path identifier information that identifies a service chain comprised of one or more service functions and order of service functions to be applied to a forward path of traffic matching classification criteria, and context information indicating whether a service function applied at a corresponding network node is stateful and thus a reverse path of traffic matching the classification criteria needs to be directed to the network node at which the stateful service function is applied. The network node applies a service function to a packet that is forwarded to it in the forward path, and determines whether the service function that it applies is stateful. When the network node determines that the service function it applies is stateful, it updates the context information in the network service header to indicate that the service function applied at the network node is stateful and that traffic for a reverse path matching the classification criteria is to be returned to the network node.

Example Embodiments

A service chain is a data structure comprised of an ordered list of service functions to be applied to packets that are forwarded along the chain. The specific instances of traversed service functions form a service path. Each individual service function referenced by the service chain may be deployed at multiple locations and therefore each chain may be executable through one or more independent service paths.

Stateful Internet Protocol (IP) services (firewall, network address translation (NAT), Deep Packet Inspection (DPI), etc.) require that flow state information be maintained and forward/reverse traffic flows be forwarded through the same service functions at the same locations. A service location is also referred to herein as a service node or network node.

In current state of the art systems, service chains are constructed using a centralized controller function and pushed out to each network node before traffic is allowed to flow through the service chain. The information pushed by the controller includes not only the details of the service chain data structures but also the state information necessary for successful packet forwarding. In this sense service chain structure and forwarding state are tightly coupled and controlled by a central orchestrator. A controller needs to have knowledge of the state requirements (stateful vs. not stateful) of every service function in a chain (or it is assumed that all services are stateful) to determine forward and reverse service path forwarding.

Each individual service function is represented using a unique service-id, e.g. $FW^1$ located at service-node$^1$ and service-node$^2$ share a common "service-id", and each service chain is represented using a unique service-path-id. The correlation/mapping of the service-id's and service-path-id forms the service chain. For example:

Service chain$_{RED}$→service-path-id [10]=[service-id$^1$, service-id$^2$, service-id$^3$].

Service chains are constructed via a central controller that determines the order of service functions that should be applied for the chain and allocates a globally unique service-path-id for each service chain it creates. To perform this function the controller needs only to keep "service-id" data structure information. However, as traffic passes through a service chain the physical location of the next service function to be applied must be known. This requires a ([service-id]-to-[location]) mapping where "location" is the infrastructure address (Internet Protocol or other address) of the service node hosting the service function. Such mappings may be held by the central controller (increasing the amount of state it must maintain) or may be distributed independently to network nodes thereby relieving the controller from having to hold the location of each individual instance of the service function.

For the purposes of the techniques presented herein, the ([service-id]-to-[location]) mappings are distributed independently, for example, through a routing protocol such as Border Gateway Protocol (BGP), Intermediate System to Intermediate System (IS-IS)/Open Shortest Path First (OSPF) or via a central controller update message.

For each service chain created at the central controller, the controller needs to push the following to the head-end of the service chain:
  [service-path-id] to [service-id ordered list] mappings e.g. service-path-id [10]=[service-id$^1$, service-id$^{22}$, service-id$^{44}$].

Each network node will already hold the following information that will allow for successful building of the service chain:
  service-id data structure for each individual service-id; and
  [service-id] to [location] mappings, e.g. [service-id$^1$]→ [service-node$^{22}$, service-node$^{64}$]

Packet forwarding through a service chain is unidirectional and driven by information contained within network service headers carried in the data plane. The head-end network node acts as a packet classifier into the service chain and determines which traffic flows require redirection through the service chain, imposing the necessary data plane network service headers and transport encapsulation to force the traffic into the service chain.

Each service function is aware of its own service-id and the location of the next service in a chain. Service functions are also aware of their state requirements: stateful (i.e., need to see bi-directional traffic) or non-stateful (unidirectional traffic is sufficient). Stateful and non-stateful are not mutually exclusive. A service function might elect to be stateful for some flows and non-stateful for other flows. Ideally, a controller would also have enough information to determine state requirements of the service functions, however, in practice the service function detail might be largely unknown to the controller. In that case, data plane state learning is required to optimize the service forwarding.

Presented herein are techniques to use a network service header (NSH), that is a service chaining specific header, added to the packets to be directed through a service chain. The NSH provides path information (i.e. service-path), location information (i.e. where the packet is in the service path) and opaque metadata, and is described in more detail hereinafter in connection with FIGS. 2 and 3.

Figure 1:
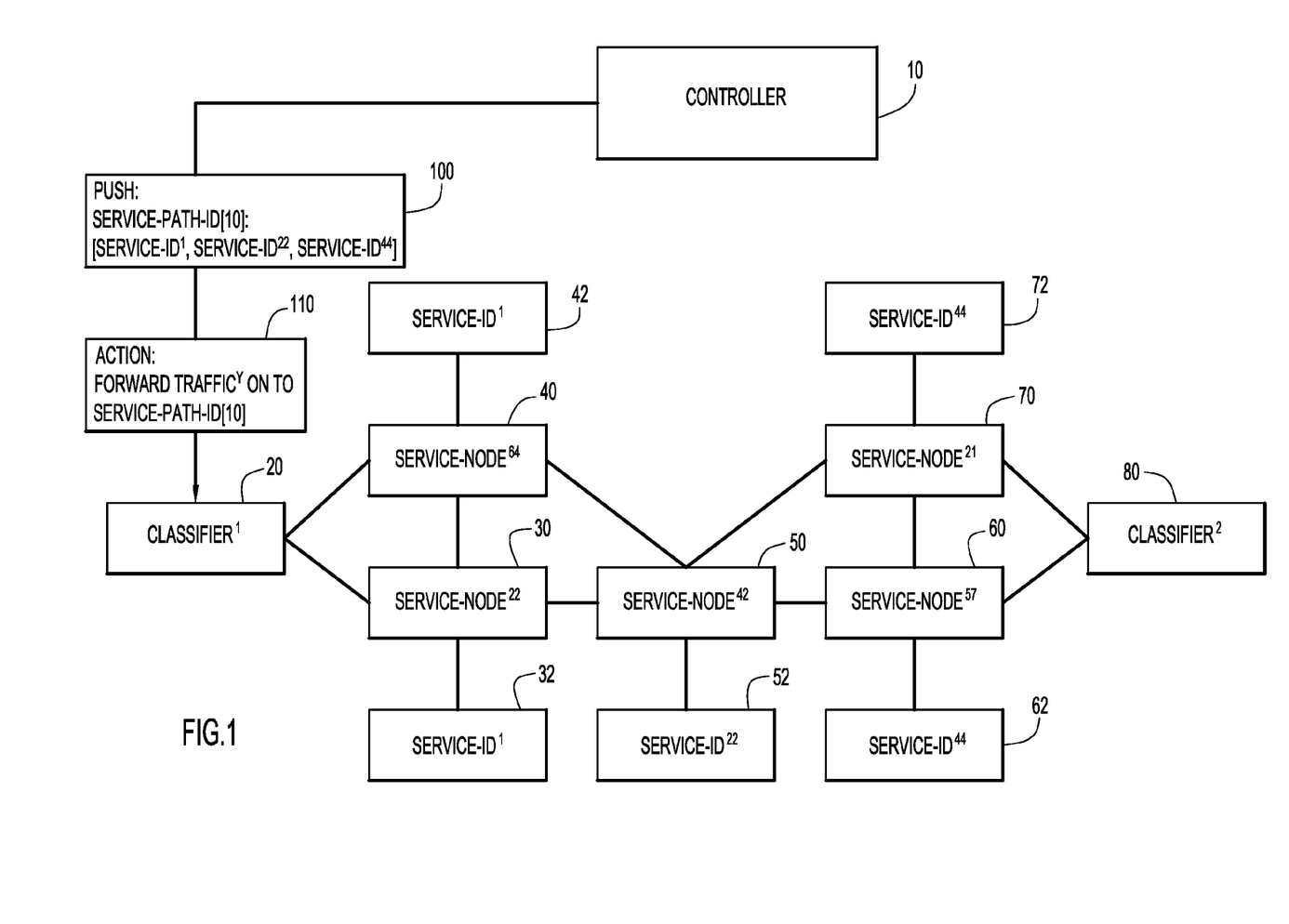
FIG. 1 is a diagram illustrating an example of a service chain in which at least one service function is stateful and data plane learning is used to facilitate generation of a reverse path to return traffic to the stateful service function.

Referring to FIG. 1, a diagram is shown for an example service chain for purposes of illustrating the techniques presented herein. FIG. 1 shows a controller 10 that communicates with a head-end node 20, a plurality of service nodes 30, 40, 50, 60 and 70, and a head-end node 80. The head-end 20 is also referred to as a classifier$^1$ and the head-end node 80 referred to as classifier$^2$. The service nodes 30, 40, 50, 60 and 70 host/support respective service-functions 32, 42, 52, 62 and 72, each service-function having a corresponding service-id. Service node 30 is also denoted service-node$^{22}$, service node 40 is denoted service-node$^{64}$, service node 50 is denoted service-node$^{42}$, service node 60 is denoted service-node$^{57}$, and service node 70 is denoted service-node$^{21}$. Some of the service-functions hosted by the service nodes are the same in the example of FIG. 1. Specifically, service node 30 and service node 40 host service-functions 32 and 42 which are the same service-function, with service-id$^1$. In other words, service-id$^1$ appears in multiple instances on different service nodes in the example scenario of FIG. 1.

Consider the following example service chain definition.
  Service-chain-id$^Y$ referenced using service-path-id[10] where, service-path-id[10]=[service-id$^1$, service-id$^{22}$, service-id$^{44}$].
  The [service-id] to [service-location] mappings are:
  service-id$^1$ reachable via service-locations [service-node$^{22}$, service-node$^{64}$]
  service-id$^{22}$ reachable via service-locations [service-node$^{42}$]
  service-id$^{44}$ reachable via service-locations [service-node$^{21}$, service-node$^{57}$]

For this example, the controller 10 pushes state/control plane information to the head-end node 20 as shown at reference numerals 100 and 110. Specifically, at 100, the controller 10 sends/pushes Service-path-id[10]: [service-id$^1$, service-id$^{22}$, service-id$^{44}$] to the head-end node 20 (classifier$^1$) and at 110, the controller 10 configures the Action: Forward traffic$^Y$ on to service-path-id[10] on the head-end node 20 (classifier$^1$).

The NSH is imposed at the start of the service path by the head-end node 20 which performs service classification operations. The head-end node 20 performs several functions. First, it receives from the controller 10 service-path-id and service-id information via a control plane as well as policy and classification rules into the service chain. Next, it determines if traffic requires servicing and therefore needs to be forwarded through the service chain. Then, it imposes the network service header: service-path-id, and metadata. The head-end node performs a lookup based on service-path-id and service-id to determine the location for the first service-id to be applied in the service chain, and forwards the data based on the lookup and mapping of service-path-id+service-id→location.

Figure 2:
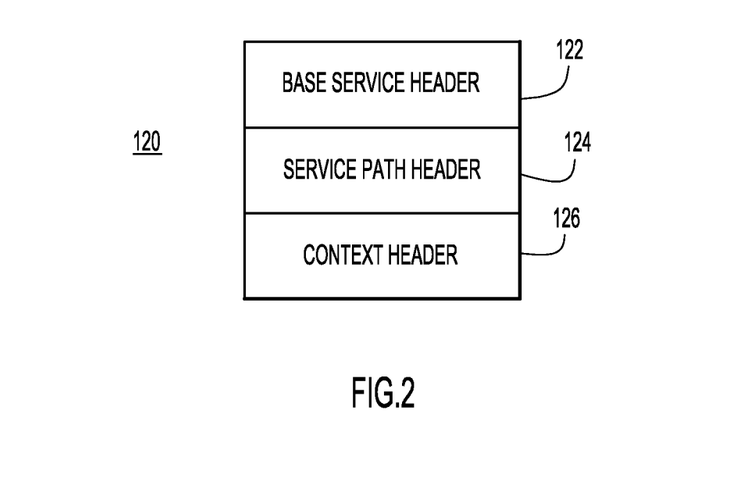
FIG. 2 is a diagram illustrating an example of a network service header configured to enable a service node to update the network service header with information indicating that a service function is stateful.

FIG. 2 shows an example of the NSH. The NSH is a data plane header added to frames/packets and contains information required for service chaining, as well as meta-data added and consumed by network nodes and service functions. Thus, the NSH forms a service plane. The packets and the NSH are then encapsulated in an outer header for transport.

The NSH shown at reference numeral 120 includes a base service header 122, a service path header 124, and a context header 126. The base service header 122 provides information about the service header, including service chain information, and is used by participating nodes to determine correct service path selection and forwarding as well as loop detection. The service path header 124 identifies a service path and participating nodes use this identifier for path selection. The context header 126 is used to provide data plane state information, and in particular to signal per-service function state requirements.

Figure 3:
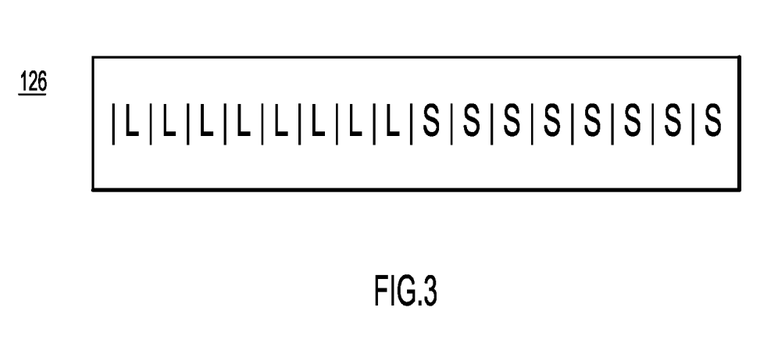
FIG. 3 is a diagram illustrating a string of bits strings in the network service header configured to indicate location in the service chain and whether a service function is stateful.

FIG. 3 illustrates an example of the context header 126. In the context header 126 there may be Location (L) bits and Stateful (S) bits. Each network node in the service chain examines the NSH of a packet that it receives. The L bits are used to indicate location within the [service-id ordered list]. A particular L bit is set to 0 if a location is not used for a service chain. The S bits are used to indicate if [service-id] within the corresponding location bit is stateful. A particular S bit is set to 1 if the service function at that location in the service chain is stateful. For example, if the NSH carries state information for 8 service functions, then there are 8 L bits and 8 S bits. If the third service function in the service chain is stateful, then the service function, via its hosting service node, sets the $3^{rd}$ S bit to 1. This signifies to subsequent network nodes in the service chain that the service function at the $3^{rd}$ service node is stateful and therefore after the forward path of the service zone is completed, traffic needs to be directed back to the $3^{rd}$ network node for that service function.

To summarize, the NSH includes a string of bits whose length corresponds to a number of service functions to be performed in the forward path for a service chain and each bit in the string of bits indicates whether a service function at a location in the service chain represented by a corresponding position in the first string of bits is stateful.

Any service node in the service chain, upon receipt of a packet containing a NSH, applies local policy based on its location within the service chain. If the service is stateful, the service also sets an S bit that corresponds to its L bit. Having executed its service function, the service node determines which is the next service node in the service chain through consultation of the ([service-id]-to-[location]) mapping table and then pushes (i.e., updates) the fields of the NSH header.

The last service node in the chain determines it is the exit point for the service chain by receipt of a NSH header indicating that the previous node executed the last service-id. Again, the last service node uses the context header to identify a stateful service (based on the S bit or bits that have been set) and records the flow information for return service path forwarding. To create the reverse chain, the context header created on the forward flow path is copied to a new NSH and service functions (based on service-id) that have S=1 receive the reverse traffic.

A more detailed example of this operation is now described in connection with FIG. 4. In this example, a packet 150 is being sent from a source $S^1$ to a host (server) with the IP address 192.168.1.1/32, for example. The NSH is shown at 160 and includes information specifying service-path-id[10]. At 170, traffic matching policy X is forwarded into service-chain-id$^X$ that is referenced using service-path-id[10]. At 172, head-node 20 (classifier$^1$) selects service-node$^{64}$ to apply the first service in the service chain, service-id$^1$. At 174, service-node$^{64}$ applies service-id$^1$ which is not a stateful service and selects service-node$^{42}$ to apply the next service in the chain, service-id$^{22}$. At 176, service-node$^{42}$ applies service-id$^{22}$ which is not a stateful service and selects service-node$^{57}$ to apply the next service in the chain, service-id$^{44}$. At 178, service-node$^{57}$ applies service-id$^{44}$ which is a stateful service. Since the service-node$^{57}$ is the fourth node in the chain (including the classifier nodes), the service-node$^{57}$ sets to "1" the fourth S bit in the context header 126 of the NSH to indicate that service-id$^{44}$ is stateful and forwards the packet to the last node in the chain, classifier$^2$. The indication that service-id$^{44}$ is stateful is shown at reference numeral 162 in FIG. 4. At 180, the classifier$^2$ detects that the fourth S bit is set for service provided at service-node$^{57}$ and dynamically updates its forwarding to apply X policy for return traffic matching the outbound flow.

Figure 4:
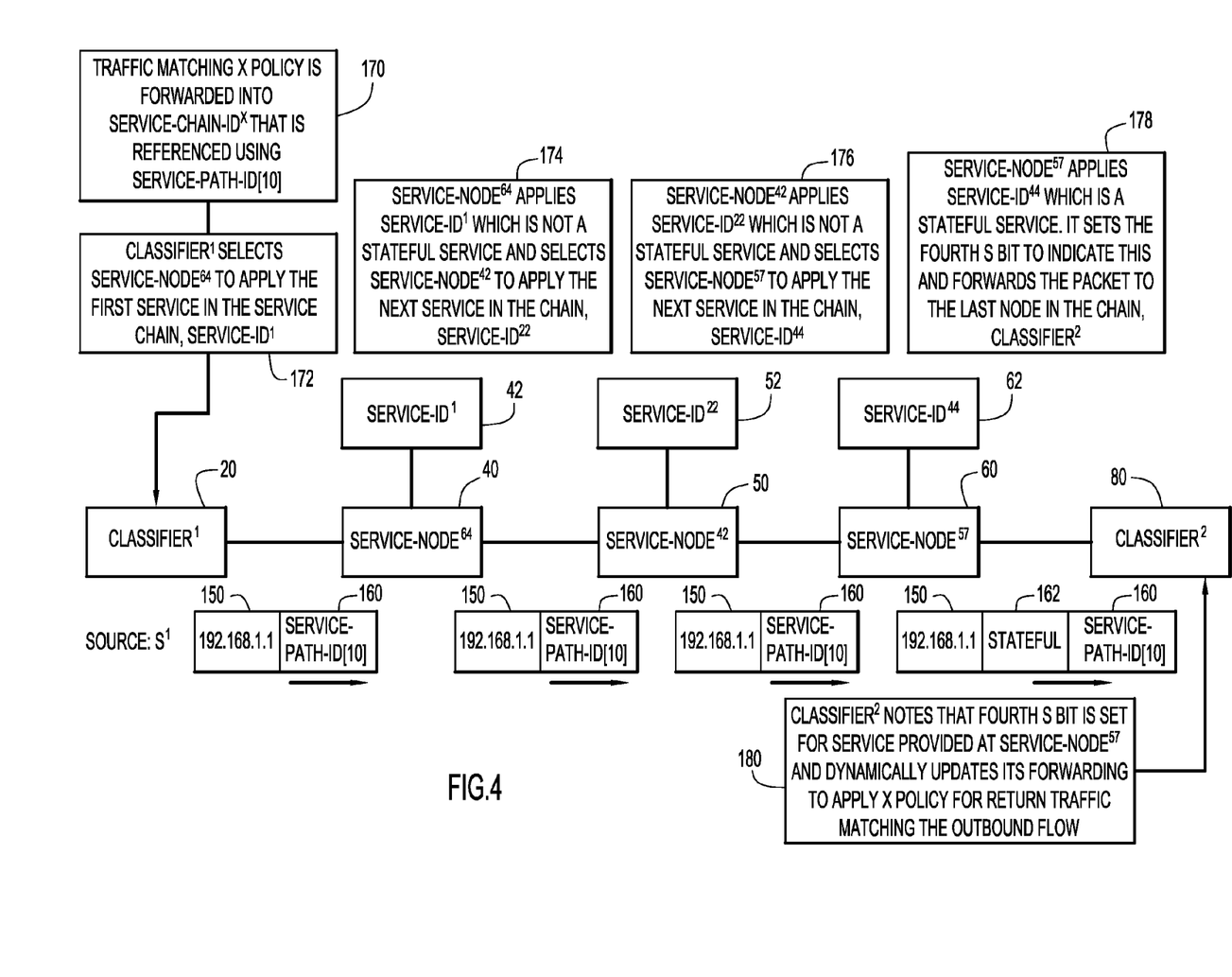
FIG. 4 is a diagram illustrating flow through service nodes of forward path of an example service chain, where at least one service function is stateful.
Figure 5:
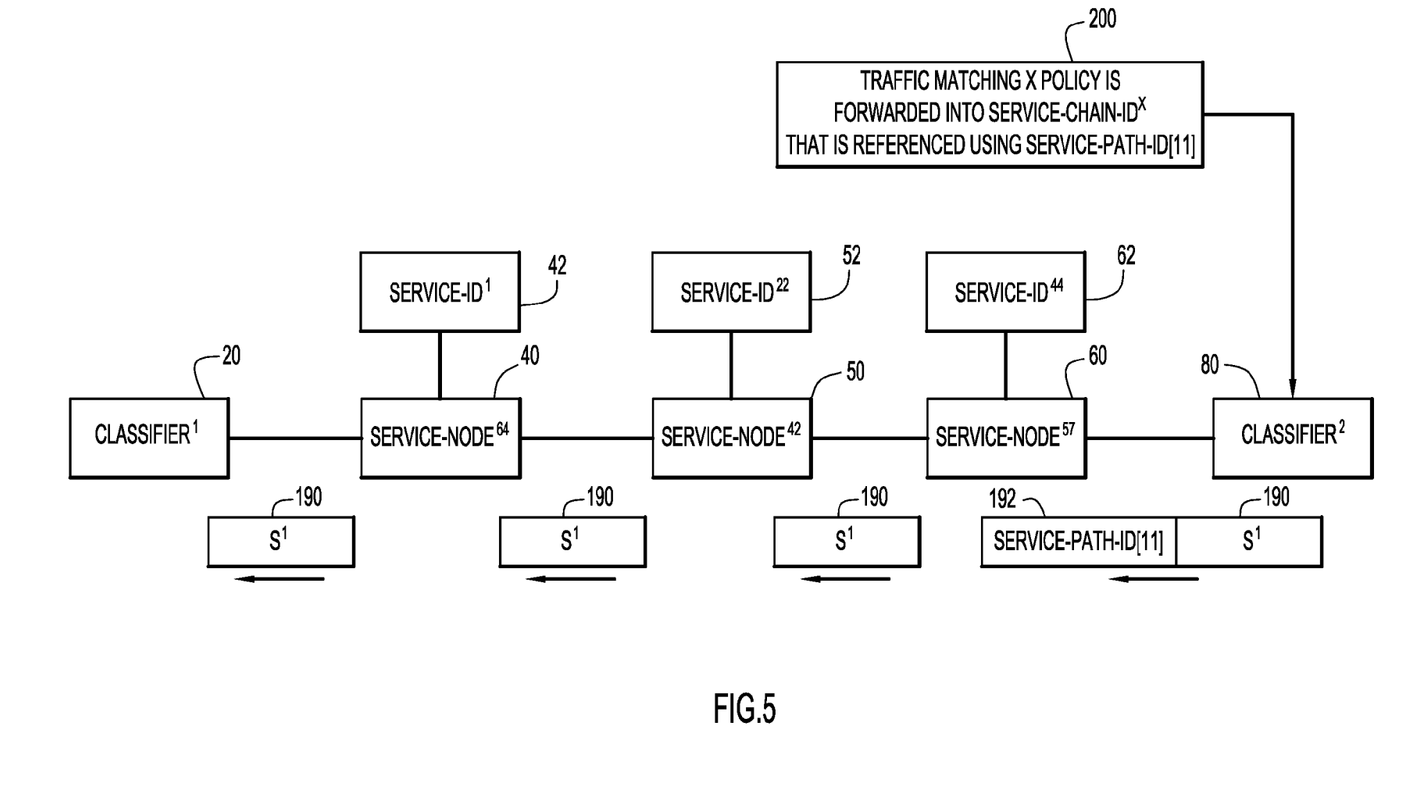
FIG. 5 is a diagram illustrating a reverse path generated for the example shown in FIG. 4.

Turning now to FIG. 5, a diagram is provided showing how reverse path traffic is handled for the example shown in FIG. 4. A reverse path packet destined to the source $S^1$ is shown at reference numeral 190. At 200, the classifier$^2$ forwards traffic matching X policy into service-chain-id$^X$ that is referenced using service-path-id[11] into the service chain and to service-node$^{57}$. This service node determines that it applied a stateful service to traffic for service-chain-id$^X$ and therefore applies a further service function operation on the packet 190 to complete the needed stateful service processing of the packet. The packet is then forwarded on down the chain, in the reverse direction of the original forward path, bypassing any service functions at nodes 40 and 50 until it reaches the classifer$^1$, which then sends the packet 190 off net to the source $S^1$.

Figure 6:
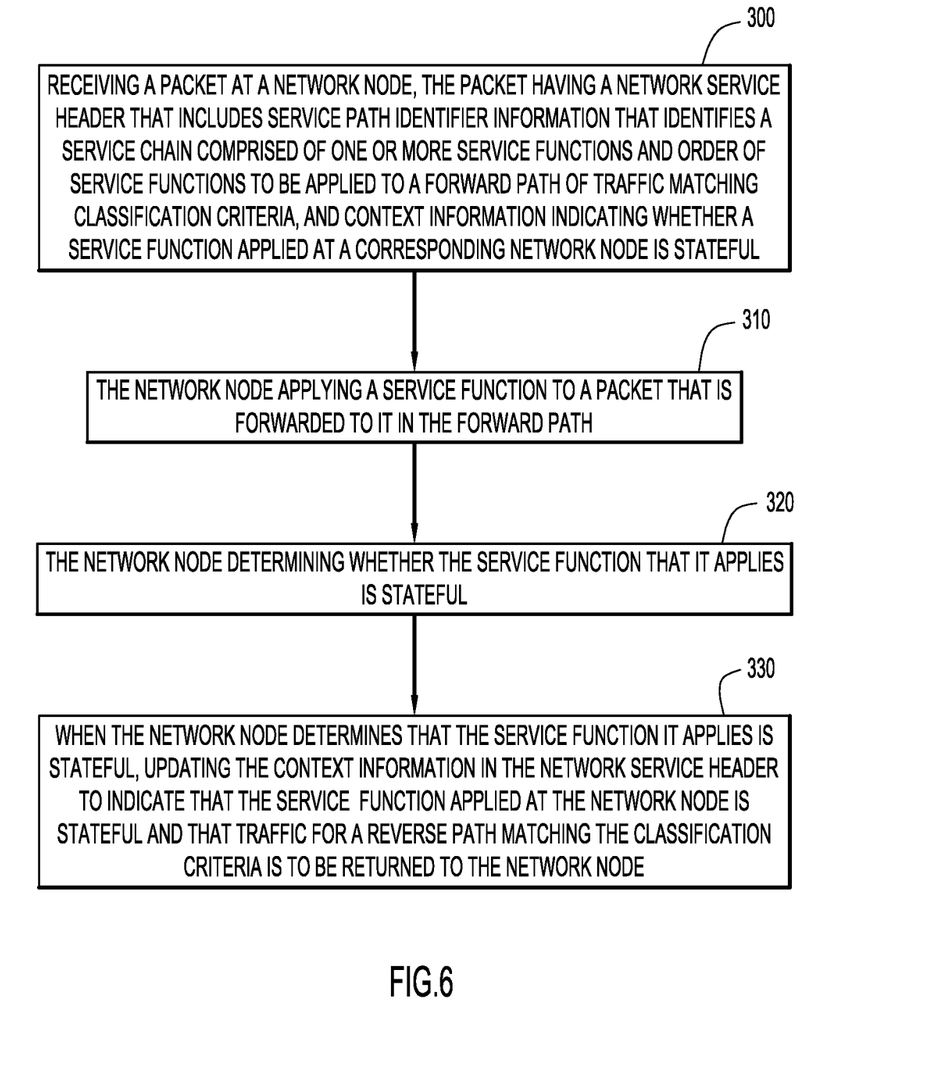
FIG. 6 is flow chart depicting operations performed in a service node according to the techniques presented herein.

Turning now to FIG. 6, a flow chart depicting the operations performed at a service node (network node) is now described. These operations are performed by a network node in a network comprising a plurality of network nodes, each configured to apply a service function to traffic that passes through the respective network node. At 300, a network node receives a packet having a network service header that includes service path identifier information that identifies a service chain comprised of one or more service functions and order of service functions to be applied to a forward path of traffic matching classification criteria. The network service header also includes location information indicating at which network node the packet is located along the service chain at a given point in time and context information indicating whether a service function applied at a corresponding network node is stateful and thus a reverse path of traffic matching the classification criteria needs to be directed to the network node at which the stateful service function is applied. At 310, the network node applies a service function to a packet that is forwarded to it in the forward path. At 320, the network node determines whether the service function that it applies is stateful. At 330, when the network node determines that the service function it applies is stateful, it updates the context information in the network service header to indicate that the service function applied at the network node is stateful and that traffic for a reverse path matching the classification criteria is to be returned to the network node. For example, the network node sets a particular bit in a string of bits (whose length corresponds to the number of network nodes in the service chain) at a position in the string of bits that corresponds to its location in the service chain.

As explained above, each network node receives from a central controller and stores information mapping service function identifiers to network nodes. Each network node will determine a next network node in the service chain at which a next service function is to be applied to the packet based on the network service header and the stored information, update the location information in the network service header to indicate an updated location of the packet along the service chain, and forward the packet to the next network node at which the next service function is to be applied to the packet.

Furthermore, each network node in the service chain determines whether it is an exit point for a packet for the service chain based on location information in the network service header indicating that a previous network node executed a last service function for the service chain, identifies a stateful service function, if any, applied in the forward path of the service chain based on the context information in the network service header and records classification criteria for forwarding traffic into the reverse path, and generates information defining a reverse service chain for the reverse path by copying, from the context information of the network service header of the forward path, information indicating which one or more service functions are stateful and to which the reverse path of traffic needs to be directed. Updating the context information is performed when the network node determines that the service function it applies is stateful and involves setting a particular bit of the second string of bits at a position of the second string of bits that corresponds to its location in the service chain.

To restate the techniques presented herein, methods are provided to decouple service chain structure from underlying network forwarding state. This allows for data plane learning of service chain forwarding requirements and association between service function state requirements and the forward/reverse forwarding paths. Advantages of these techniques include enabling dynamic bidirectional service chain construction through data plane metadata, and in-network service chain redundancy and packet forwarding. Service function locality information is pushed into the network, relieving a central controller from having to store all of the service function state. These techniques also facilitate multi-tenancy applicability to service chaining.

Figure 7:
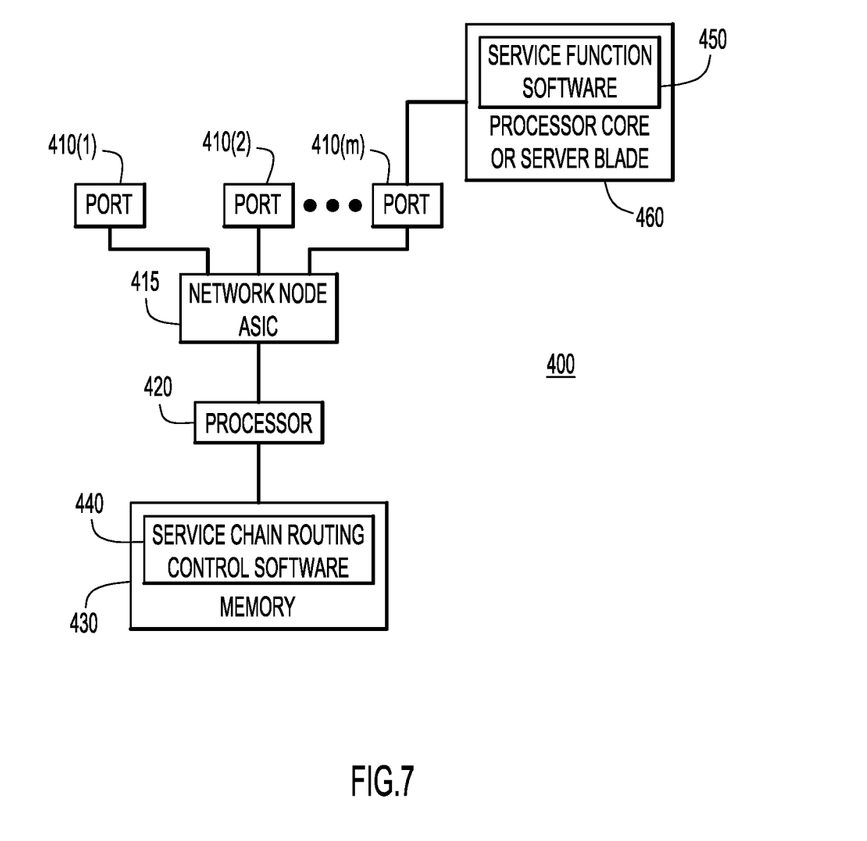
FIG. 7 is an example block diagram of a service node configured to perform the operations presented herein.

FIG. 7 illustrates an example block diagram for a network node, e.g., a switch, router, gateway, etc., configured to perform the operations described herein for a network node. It should be understood that a virtual network node would be a software-emulated or virtualized version of what is shown in FIG. 7. The network node 400 comprises a plurality of ports 410(1)-410(m), a network Application Specific Integrated Circuit (ASIC) 415, a processor or central processing unit (CPU) 420 and memory 430. The ports 710(1)-710(m) receive ingress packets and output egress packets from the network node. The network node ASIC 720 directs incoming packets to ports for egress according to logic as well as controls from the processor 420. For example, if the network node is a router, then the ASIC 415 is a router ASIC configured for network routing functions, and if the network node is a switch, then the ASIC 415 is a switch ASIC configured for network switch functions. The processor 420 is a microprocessor or microcontroller, for example, and executes instructions for the service chain routing control firmware/software 440 stored in memory 430. The service chain routing control firmware/software 440 includes instructions that, when executed by the processor 420, cause the processor to perform the operations described herein in connection with FIGS. 1-6 for a network node/service node, including examining bits of the NSH, setting bits of the NSH when the network node applies a stateful service function, etc.

The operations of a service function associated with network node 400 are implemented by service function software 450 running on a processor core or server blade 460 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 420) it is operable to perform the operations described herein.

Figure 8:
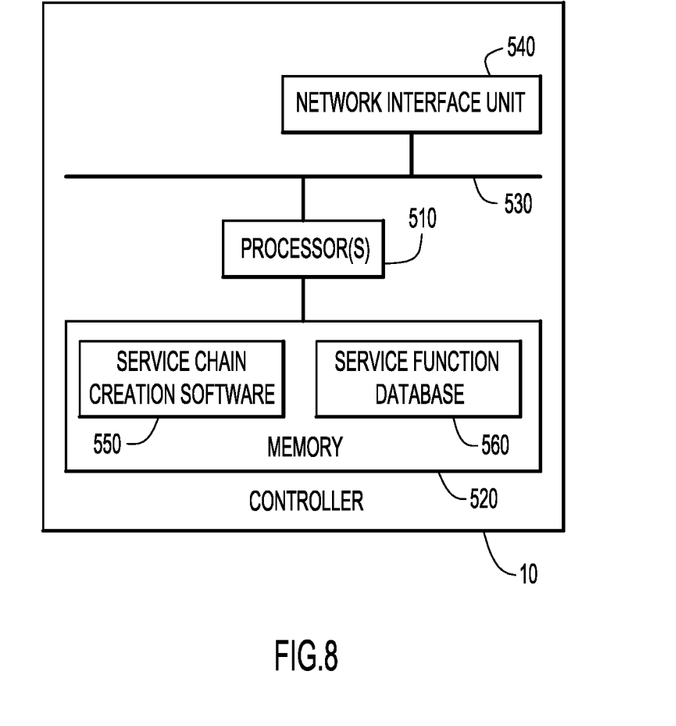
FIG. 8 is an example block diagram of a controller configured to perform controller operations described herein.

Turning now to FIG. 8, an example block diagram is shown for a controller configured to perform the operations described herein for controller 10. It should be understood that a virtual controller would be a software-emulated or virtualized version of what is shown in FIG. 8, such as software running in a data center. The controller 10 includes one or more processors 510, memory 520, a bus 530 and a network interface unit 540. The processor 510 may be a microprocessor or microcontroller. The network interface unit 540 facilitates network communications between the controller 10 and the network nodes. The processor 510 executes instructions associated with software stored in memory 520. Specifically, the processor 510 stores service chain creation software 550 that, when executed by the processor 510, causes the processor 510 to perform the operations for the controller described herein with respect to FIGS. 1-6. The memory 520 also stores a service function database 560 that contains data about the service functions active on each of the network nodes, and attributes about those service functions.

The memory 520 may comprise read only memory (ROM), random access memory (RAM), magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

Thus, in apparatus form, an apparatus is provided comprising a network interface unit configured to enable communications over a network including a plurality of network nodes each configured to apply a service function to traffic that passes through the respective network node; memory; and a processor coupled to the network interface unit and the memory, wherein the processor is configured to: receive at a network node a packet that has a network service header including service path identifier information that identifies a service chain comprised of one or more service functions and order of service functions to be applied to a forward path of traffic matching classification criteria, and context information indicating whether a service function applied at a corresponding network node is stateful and thus a reverse path of traffic matching the classification criteria needs to be directed to the network node at which the stateful service function is applied; apply a service function to a packet that is forwarded to it in the forward path; determine whether the service function that it applies is stateful; and when it determined that the service function it applies is stateful, update the context information in the network service header to indicate that the service function applied at the network node is stateful and that traffic for a reverse path matching the classification criteria is to be returned to the network node.

Similarly, one or more computer readable storage media are provided encoded with software comprising computer executable instructions and when the software is executed operable to: in a network comprising a plurality of network nodes each configured to apply a service function to traffic that passes through the respective network node, receive a packet at a network node, the packet having a network service header that includes service path identifier information that identifies a service chain comprised of one or more service functions and order of service functions to be applied to a forward path of traffic matching classification criteria, and context information indicating whether a service function applied at a corresponding network node is stateful and thus a reverse path of traffic matching the classification criteria needs to be directed to the network node at which the stateful service function is applied; apply a service function to a packet that is forwarded to it in the forward path; determine whether the service function that it applies is stateful; and when it determined that the service function it applies is stateful, update the context information in the network service header to indicate that the service function applied at the network node is stateful and that traffic for a reverse path matching the classification criteria is to be returned to the network node.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
receiving a packet at a network node of a service chain;
determining that the network node is an exit point for the packet for the service chain based on location information in a header of the packet;
identifying a stateful service function applied in the service chain prior to receipt of the packet at the network node of the service chain based on context information in the header, wherein the stateful service function maintains flow state information for a flow associated with the packet in forward and reverse flow path directions, and wherein the context information comprises one or more bits indicating the stateful service function as being stateful and identifying the network node that applied the stateful service function;
recording classification criteria for forwarding return traffic into the service chain; and
generating information defining a reverse path for the return traffic from the context information identifying the stateful service function, wherein the reverse path directs return traffic to the network node that applied the stateful service function in the service chain.

2. The method of claim 1, further comprising:
receiving a return packet of the return traffic at the network node;
determining the return packet matches the classification criteria; and
forwarding the return packet in the reverse path in the service chain.

3. The method of claim 1, wherein the information defining the reverse path indicates that network nodes that applied non-stateful services are bypassed in the reverse path of the service chain.

4. The method of claim 1, wherein identifying the stateful service function applied in the service chain comprises identifying the stateful service function from a string of bits in the header, wherein a length of the string of bits corresponds to a number of service functions performed in a forward path for the service chain, a value of each bit in the string of bits indicating whether a service function at a location in the service chain represented by a corresponding position in the string of bits is stateful.

5. The method of claim 1, wherein identifying the stateful service function applied in the service chain comprises identifying the stateful service function from a string of bits in the header, wherein the string of bits comprises length bits and stateful bits corresponding to the length bits, wherein the length bits indicate network nodes along a forward path of the service chain that applied a service function and the corresponding stateful bits indicate if the network nodes applied a stateful service function.

6. The method of claim 5, wherein generating the information defining the reverse service path comprises generating the information indicating nodes corresponding to location bits whose corresponding stateful bits indicate the network nodes which applied stateful service functions.

7. An apparatus comprising:
a network interface unit configured to enable communications over a network;
memory; and
a processor coupled to the network interface unit and the memory, the processor configured to:
receive, via the network interface unit, a packet at a network node of a service chain;
determine that the network node is an exit point for the packet for the service chain based on location information in a header of the packet;
identify a stateful service function applied in the service chain prior to receipt of the packet at the network node of the service chain based on context information in the header, wherein the stateful service function maintains flow state information for a flow associated with the packet in forward and reverse flow path directions, and wherein the context information comprises one or more bits indicating the stateful service function as being stateful and identifying the network node that applied the stateful service function;
record, in the memory, classification criteria for forwarding return traffic into the service chain; and
generate information defining a reverse path from the context information identifying the stateful service function, wherein the reverse path directs return traffic to the network node that applied the stateful service function in the service chain.

8. The apparatus of claim 7, wherein the processor is further configured to:
receive, via the network interface unit, a return packet of the return traffic at the network node;
determine that the return packet matches the classification criteria; and
forward, via the network interface unit, the return packet into the service chain.

9. The apparatus of claim 7, wherein the information defining the reverse path indicates that network nodes that applied non-stateful services are bypassed in the reverse path of the service chain.

10. The apparatus of claim 7, wherein the processor is further configured to identify the stateful service function applied in the service chain by identifying the stateful service function from a string of bits in the header, wherein a length of the string of bits corresponds to a number of service functions performed in a forward path for the service chain, a value of each bit in the string of bits indicating whether a service function at a location in the forward path of the service chain represented by a corresponding position in the string of bits is stateful.

11. The apparatus of claim 7, wherein the processor is further configured to identify the stateful service function applied in the service chain by identifying the stateful service function from a string of bits in the network service header, wherein the string of bits comprises length bits and stateful bits corresponding to the length bits, wherein the length bits indicate network nodes along a forward path of the service chain that applied a service function and the corresponding stateful bits indicate if the network nodes applied a stateful service function.

12. One or more non-transitory computer readable storage media encoded with software comprising computer executable instructions and when the software is executed operable to:
receive a packet at a network node of a service chain;
determine that the network node is an exit point for the packet for the service chain based on location information in a header of the packet;
identify a stateful service function applied in the service chain prior to receipt of the packet at the network node of the service chain based on context information in the header, wherein the stateful service function maintains flow state information for a flow associated with the packet in forward and reverse flow path directions, and wherein the context information comprises one or more bits indicating the stateful service function as being stateful and identifying the network node that applied the stateful service function;
record classification criteria for forwarding return traffic into the service chain; and
generate information defining a reverse path from the context information identifying the stateful service function, wherein the reverse path directs return traffic to the network node that applied the stateful service function in the service chain.

13. The non-transitory computer readable storage media of claim 12, further comprising instructions operable to:
receive a return packet of the return traffic at the network node;
determine that the return packet matches the classification criteria; and
forward the return packet in the service chain.

14. The non-transitory computer readable storage media of claim 12, the information defining the reverse path indicates that network nodes that applied non-stateful services are bypassed in the reverse path of the service chain.

15. The non-transitory computer readable storage media of claim 12, wherein the instructions operable to identify the stateful service function applied in the service chain comprise instructions operable to identify the stateful service function from a string of bits in the network service header, wherein a length of the string of bits corresponds to a number of service functions performed in a forward path for the service chain, a value of each bit in the string of bits indicating whether a service function at a location in the forward path of the service chain represented by a corresponding position in the string of bits is stateful.

16. The non-transitory computer readable storage media of claim 12, wherein the instructions operable to identify the stateful service function applied in the service chain comprise instructions operable to identify the stateful service function from a string of bits in the network service header, wherein the string of bits comprises length bits and stateful bits corresponding to the length bits, wherein the length bits indicate network nodes along a forward path of the service chain that applied a service function and the corresponding stateful bits indicate if the network nodes applied a stateful service function.

17. The non-transitory computer readable storage media of claim 16, wherein the instructions operable to generate the information defining the reverse path comprise instructions operable to generate the information defining the reverse path including network nodes corresponding to location bits whose corresponding stateful bits indicate the network nodes applied stateful service functions.

18. The apparatus of claim 11, wherein the processor is further configured to generate the information defining the reverse path including network nodes corresponding to location bits whose corresponding stateful bits indicate the network nodes applied stateful service functions.

19. The method of claim 1, further comprising receiving at the exit point network node from a central controller a mapping of service functions to network nodes.

20. The non-transitory computer readable storage media of claim 12, further comprising instructions operable to receive at the exit point network node from a central controller a mapping of service functions to network nodes.

* * * * *